United States Patent
Chandrahasan et al.

(10) Patent No.: US 12,554,932 B2
(45) Date of Patent: Feb. 17, 2026

(54) DYNAMIC SEMANTIC SYNOPSIS GENERATION FOR DATASETS IN DATA CATALOG

(71) Applicant: International Business Machines Corporation, Armonk, NY (US)

(72) Inventors: Rajmohan Chandrahasan, Tamilnadu (IN); Anupam Sanghi, Gwalior (IN); Arvind Agarwal, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 167 days.

(21) Appl. No.: 18/422,359

(22) Filed: Jan. 25, 2024

(65) Prior Publication Data

US 2025/0245435 A1 Jul. 31, 2025

(51) Int. Cl.
G06F 40/279 (2020.01)
G06F 16/9537 (2019.01)
G06F 40/30 (2020.01)

(52) U.S. Cl.
CPC .......... *G06F 40/30* (2020.01); *G06F 16/9537* (2019.01)

(58) Field of Classification Search
CPC .... G06F 16/9537; G06F 16/387; G06F 40/30; G06F 40/279
See application file for complete search history.

(56) References Cited

U.S. PATENT DOCUMENTS

| | | | | |
|---|---|---|---|---|
| 10,402,442 | B2 * | 9/2019 | Viegas | G06F 16/44 |
| 10,846,616 | B1 * | 11/2020 | Busbridge | G06N 3/006 |
| 11,176,116 | B2 * | 11/2021 | Javitt | G06F 16/2365 |
| 11,556,514 | B2 * | 1/2023 | Raphael | G06F 16/221 |
| 11,609,680 | B2 | 3/2023 | Reynolds et al. | |
| 12,204,567 | B2 * | 1/2025 | Dharaskar | G06F 16/25 |
| 2012/0310923 | A1 | 12/2012 | Ross | |
| 2015/0288800 | A1 * | 10/2015 | Pianese | H04W 64/006 370/255 |
| 2021/0357443 | A1 * | 11/2021 | Rawat | G06N 20/00 |
| 2024/0296187 | A1 * | 9/2024 | Khan | G06F 16/906 |
| 2025/0148211 | A1 * | 5/2025 | Alberg | G06F 21/60 |

OTHER PUBLICATIONS

Chandel, "RDF Briefer: a System for Automatic Generation of RDF Dataset Synopsis," 2018, pp. 1-55, University of Georgia, Athens, Georgia, United States, accessed Jan. 2, 2024, https://getd.libs.uga.edu/pdfs/chandel_akanksha_201812_ms.pdf.

(Continued)

*Primary Examiner* — Daniel Abebe
(74) *Attorney, Agent, or Firm* — Yee & Associates, P.C.

(57) ABSTRACT

Generating a semantic synopsis is provided. A dataset comprising structured data is received and semantic analysis of the dataset is performed to determine categories of information included in the datasets. A spatio-temporal analysis of the dataset is also performed to determine time periods and locations to which the dataset applies. A static synopsis of the dataset is then generated in natural language sentences that describes semantic information in the dataset and time periods and locations covered by the dataset. The synopsis can be customized according to a user role and search query data.

20 Claims, 10 Drawing Sheets

(56) References Cited

OTHER PUBLICATIONS

Färber et al, "Recommending Datasets for Scientific Problem Descriptions," Proceedings of the 30th ACM International Conference on Information and Knowledge Management, 2021, 5 pages, Karlsruhe Institute of Technology, accessed Jan. 2, 2024, https://www.aifb.kit.edu/images/2/23/DataRec_CIKM2021.pdf.

Khurana et al., "Semantic Annotation for Tabular Data," Proceedings of the 30th ACM International Conference on Information & Knowledge, Oct. 2021, 9 pages, Association for Computing Machinery, accessed Jan. 2, 2024, https://dl.acm.org/doi/abs/10.1145/3459637.3482295.

Koesten et al., "Everything you always wanted to know about a dataset: Studies in data summarisation," International Journal of Human-Computer Studies, Mar. 2020, pp. 1-8, Elsevier, accessed Jan. 2, 2024, https://www.sciencedirect.com/science/article/pii/S1071581918306153.

Liu et al, "Towards Comprehensive Description Generation from Factual Attribute-value Tables," Proceedings of the 57th Annual Meeting of the Association for Computational Linguistics, Jul. 2019, pp. 5985-5996, Association for Computational Linguistics, Florence, Italy, accessed Jan. 2, 2024, https://aclanthology.org/P19-1600.pdf.

Liu et al., "Hierarchical Encoder with Auxiliary Supervision for Neural Table-to-Text Generation: Learning Better Representation for Tables," Proceedings of the AAAI Conference on Artificial Intelligence, Jul. 17, 2019, pp. 6786-6793, vol. 3, No. 01, AAAI, accessed Jan. 2, 2024, https://ojs.aaai.org/index.php/AAAI/article/view/4653.

Nie et al, "Operation-guided Neural Networks for High Fidelity Data-To-Text Generation," Proceedings of the 2018 Conference on Empirical Methods in Natural Language Processing, Oct.-Nov. 2018, pp. 3879-3889, Association for Computational Linguistics, Brussels, Belgium, accessed Jan. 2, 2024, https://aclanthology.org/D18-1422.pdf.

NYPD, "Motor Vehicle Collisions—Crashes," NYC OpenData, Jan. 9, 2024, NYC OpenData, accessed Jan. 10, 2024, https://data.cityofnewyork.us/Public-Safety/Motor-Vehicle-Collisions-Crashes/h9gi-nx95.

Parikh et al., "ToTTo: A Controlled Table-To-Text Generation Dataset," Proceedings of the 2020 Conference on Empirical Methods in Natural Language Processing, 2020, pp. 1173-1186, Association for Computational Linguistics, accessed Jan. 3, 2024, https://aclanthology.org/2020.emnlp-main.89/.

Phillips et al, "Toward Best Practices for Unstructured Descriptions of Research Data," Proceedings of the 84th Annual Meeting of the Association for Information Science and Technology, Oct. 2021, pp. 304-315, Dalhousie University, accessed Jan. 2, 2024, https://dalspace.library.dal.ca/bitstream/handle/10222/80680/ASIST%202021%20Phillips%20Smit.pdf?sequence=1&isAllowed=y.

Suhara et al., "Annotating Columns with Pre-trained Language Models," SIGMOD '22: Proceedings of the 2022 International Conference on Management of Data, Jun. 2022, pp. 1493-1503, Association for Computing Machinery, New York, New York, United States, accessed Jan. 10, 2024, https://arxiv.org/pdf/2104.01785.pdf.

Wang et al., "Auto-generating Textual Data Stories Using Data Science Pipelines," Proceedings of the 2021 4th International Conference on Algorithms, Computing and Artificial Intelligence, Feb. 25, 2022, 8 pages, Article No. 96, ACAI, accessed Jan. 2, 2024, https://dl.acm.org/doi/abs/10.1145/3508546.3508642.

Xian et al., "EXACTA: Explainable Column Annotation," KDD '21: Proceedings of the 27th ACM SIGKDD Conference on Knowledge Discovery & Data Mining, Aug. 2021, pp. 3775-3785, Association for Computing Machinery, New York, New York, United States, accessed Jan. 19, 2024, https://dl.acm.org/doi/abs/10.1145/3447548.3467211.

Zhang et al., "Summarizing and Exploring Tabular Data in Conversational Search," Proceedings of the 43rd International ACM SIGIR Conference on Research and Development in Information Retrieval, 2020, pp. 1537-1540, Association for Computing Machinery, New York, New York, United States, accessed on Jan. 3, 2023, https://dl.acm.org/doi/10.1145/3397271.3401205.

\* cited by examiner

FIG. 2

| CRASH DATE | CRASH TIME | BOROUGH | ZIP CODE | LATITUDE | LONGITUDE | NUMBER OF PERSONS INJURED | NUMBER OF PEDESTRIANS INJURED | NUMBER OF CYCLISTS INJURED | CONTRIBUTING FACTOR VEHICLE 1 | COLLISION_N |
| --- | --- | --- | --- | --- | --- | --- | --- | --- | --- | --- |
| 09/11/21 | 2:39 | | | | | 2 | 0 | 0 | AGGRESSIVE D | 4455765 |
| 03/26/22 | 11:45 | | | | | 1 | 0 | 0 | PAVEMENT SLIPPERY | 4513547 |
| 06/29/22 | 6:55 | | | | | 0 | 0 | 0 | FOLLOWING TOO | 4541903 |
| 09/11/21 | 9:35 | BROOKLYN | 11208 | 40.667202 | -73.8665 | 0 | 0 | 0 | UNSPECIFIED | 4456314 |
| 12/14/21 | 8:13 | BROOKLYN | 11233 | 40.683304 | -73.917274 | 0 | 0 | 0 | | 4486609 |
| 04/14/21 | 12:47 | | | | | 0 | 0 | 0 | UNSPECIFIED | 4407458 |
| 12/14/21 | 17:05 | | | 40.709183 | -73.956825 | 0 | 0 | 0 | PASSING TOO | 4486555 |
| 12/14/21 | 8:17 | BRONX | 10475 | 40.86816 | -73.83148 | 2 | 0 | 0 | UNSPECIFIED | 4486660 |
| 12/14/21 | 21:10 | BROOKLYN | 11207 | 40.67172 | -73.8971 | 0 | 0 | 0 | DRIVER INEXPE | 4487074 |
| 12/14/21 | 14:58 | MANHATTAN | 10017 | 40.75144 | -73.97397 | 0 | 0 | 0 | PASSING TOO | 4486519 |
| 12/13/21 | 0:34 | | | 40.701275 | -73.88887 | 0 | 0 | 0 | PASSING OR LA | 4486934 |
| 12/14/21 | 16:50 | QUEENS | 11413 | 40.675884 | -73.75577 | 0 | 0 | 0 | TURNING IMPR | 4487127 |
| 12/14/21 | 8:30 | | | 40.59662 | -74.00231 | 0 | 0 | 0 | UNSAFE LANE | 4486634 |
| 12/14/21 | 0:59 | | | | | 0 | 0 | 0 | UNSAFE SPEED | 4486564 |
| 12/14/21 | 23:10 | QUEENS | 11434 | 40.66684 | -73.78941 | 2 | 0 | 0 | REACTION TO | 4486635 |
| 12/14/21 | 17:58 | BROOKLYN | 11217 | 40.68158 | -73.97463 | 0 | 0 | 0 | PASSING TOO | 4486604 |
| 12/14/21 | 20:03 | BROOKLYN | 11226 | 40.65068 | -73.95881 | 4 | 0 | 0 | STEERING FAILURE | 4486991 |
| 12/11/21 | 1:28 | | | | | 3 | 0 | 0 | TRAFFIC CONTR | 4486284 |
| 12/11/21 | 19:43 | BRONX | 10463 | 40.87262 | -73.904686 | 1 | 0 | 0 | UNSPECIFIED | 4487040 |

DYNAMIC SEMANTIC SYNOPSIS GENERATION FOR DATASETS IN DATA CATALOG

BACKGROUND

The disclosure relates generally to datasets and more specifically to assisting users is selecting appropriate datasets according to user needs.

Dataset is a structured collection of data which can be used for a diverse set of tasks across data analytics and modeling use cases. In fields such as data science, machine learning, and statistics, a dataset typically comprises a set of data points that are organized and used for analysis or to train and test predictive models.

Datasets in a data catalog or data marketplace come from a variety of sources. Many datasets do not have any description available about the content of the dataset. For a user, finding the right dataset is a tedious task due to large number of datasets available, large size of these datasets and more importantly very limited documentation available about the datasets.

SUMMARY

According to an illustrative embodiment, a computer-implemented method for generating a semantic synopsis is provided. A dataset comprising structured data is received and semantic analysis of the dataset is performed to determine categories of information included in the datasets. A spatio-temporal analysis of the dataset is also performed to determine time periods and locations to which the dataset applies. A static synopsis of the dataset is then generated in natural language sentences that describes semantic information in the dataset and time periods and locations covered by the dataset. The synopsis can be customized according to a user role and search query data. According to other illustrative embodiments, a computer system and a computer program product for generating a semantic synopsis are provided.

BRIEF DESCRIPTION OF THE DRAWINGS

FIG. 2 depicts an example dataset to which the illustrative embodiments can be applied;

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
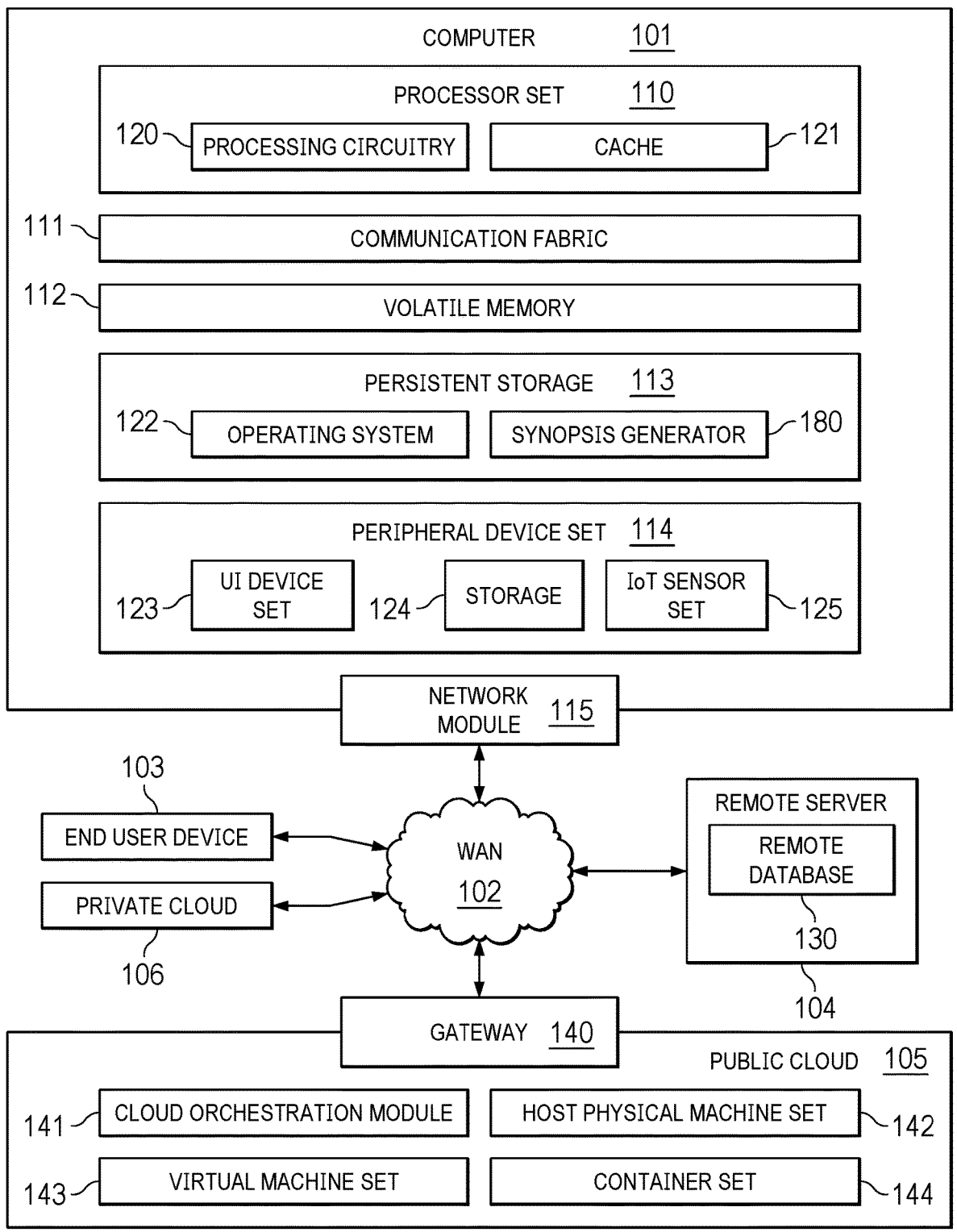
FIG. 1 is a block diagram of a computing environment in accordance with an illustrative embodiment.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods, such as semantic synopsis generator 180. In this example, semantic synopsis generator 180 can operate to manage access for computing environments.

In addition to semantic synopsis generator 180, computing environment 100 includes, for example, computer 101, wide area network (WAN) 102; end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and semantic synopsis generator 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in semantic synopsis generator 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in semantic synopsis generator 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to a "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The illustrative embodiments recognize and take into account a number of different considerations as described herein. For example, the illustrative embodiments recognize and take into account that for a user, finding the right dataset is a tedious task due to large number of datasets available, large size of these datasets and more importantly very limited documentation available about the datasets. Many datasets do not have any description available about the content of the dataset. There are also many derived datasets in the data catalog for which there are not any descriptions available.

The illustrative embodiments also recognize and take into account that some datasets may have manual description, but it may not be accurate or complete. Furthermore, the description may not capture relevant information about the dataset in a concise and semantically rich manner.

The illustrative embodiments also recognize and take into account that manually creating such dataset synopsis for the datasets in an enterprise data catalog is a very tedious, time-consuming and error-prone task as it requires understanding what each dataset contains along different dimensions.

The illustrative embodiments provide a method to automatically generate customized semantic synopsis of a tabular dataset in a data catalog/data marketplace in natural language using the table data, user persona, user contexts and search query. The illustrative embodiments generate a semantic synopsis of a dataset by semantic analysis and spatio-temporal analysis of table data. The synopsis can be customized based on user role and user context in addition to table data. The synopsis can be further customized according to search results in a data catalog based on user search queries and past interactions in addition to table data.

As used herein, "a number of" when used with reference to items, means one or more items. For example, "a number of parameters" is one or more parameters. As another example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

FIG. 2 depicts an example dataset to which the illustrative embodiments can be applied. Example dataset 200 relates to motor collision data in the boroughs of New York City for the year 2021.

Figure 3:
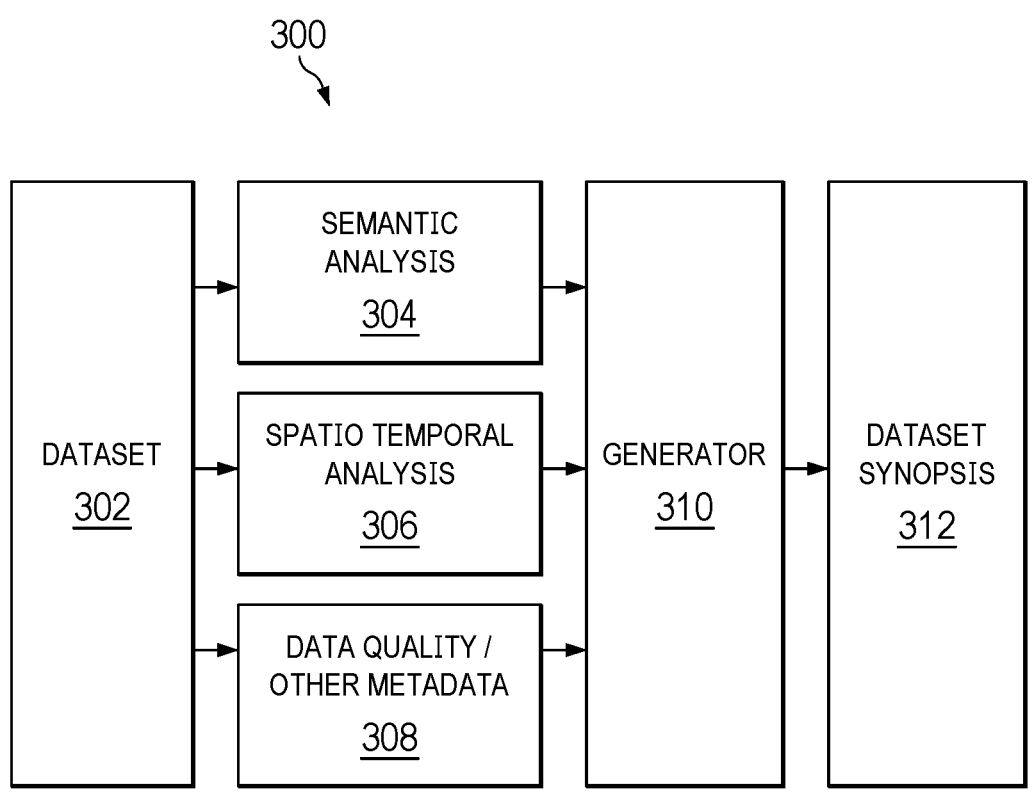
FIG. 3 depicts a block diagram illustrating dataset synopsis generation in accordance with an illustrative embodiment.

FIG. 3 depicts a block diagram illustrating dataset synopsis generation in accordance with an illustrative embodiment. Dataset synopsis generation 300 can be implemented in synopsis generator 180 shown in FIG. 1.

In dataset synopsis generation 300, a dataset 302 undergoes concurrent semantic analysis 304 and spatio-temporal analysis 306. Dataset 302 might comprise a structured enterprise dataset containing a large number of columns and rows, such as, e.g., dataset 200 in FIG. 2. The results from the semantic analysis 304 and spatio-temporal analysis 306 are fed into a generator 310. Data quality and other metadata 308 may also be fed into generator 310 concurrently with the result from the semantic analysis 304 and spatio-temporal analysis 306.

From these inputs, generator 310 generates a static dataset synopsis 312. Static dataset synopsis 312 is referred to as static because it does not change unless the underlying dataset changes. For example, referring to the dataset shown in FIG. 2, the static synopsis might be: "This dataset includes information about motor vehicle collision date, location, and time of occurrence in different boroughs of New York City for the year 2021. In addition, it contains information related to persons impacted by the collisions, vehicle details, and details regarding contributing factors."

In contrast, a dynamic semantic synopsis is generated or customized according to some of the runtime information during dataset discover such as user role/persona, user search query data, etc. (see FIGS. 6 and 7 below) in addition to the standard dataset analysis shown in FIG. 3.

Figure 4:
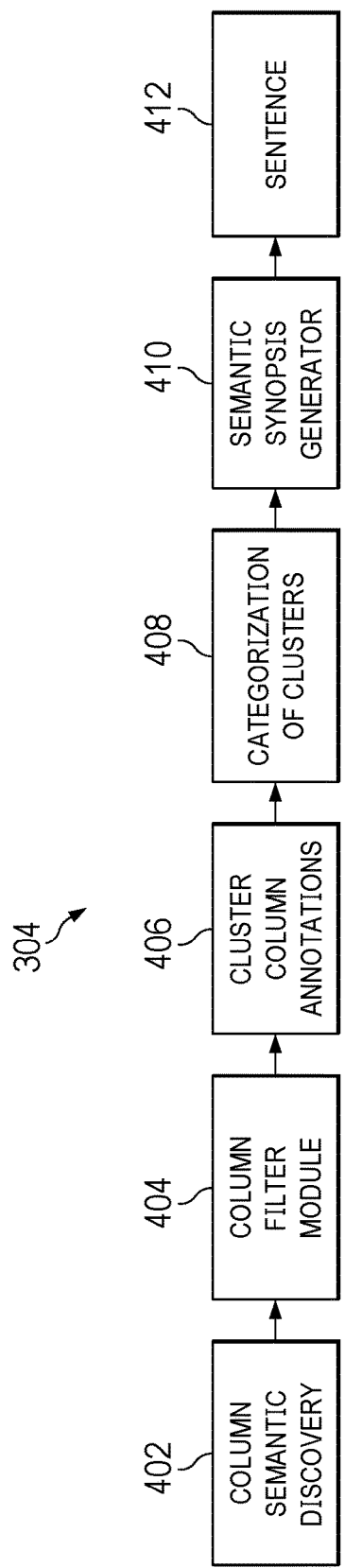
FIG. 4 depicts a block diagram illustrating sematic analysis in accordance with an illustrative embodiment.

FIG. 4 depicts a block diagram illustrating sematic analysis in accordance with an illustrative embodiment. FIG. 4 illustrates an example expanded view of sematic analysis 304 in FIG. 3. Semantic analysis is the process of extracting meaning from text, allowing computers to understand and interpret sentences and paragraphs based on their grammatical structure and by identifying relationships between individual words in context.

Semantic analysis 304 begins with column semantic discovery 402 which discovers the semantic name, meaning, and type of each column in the structured database. This first phase of the system discovers semantically meaningful name/column annotations to describe each column in the dataset using the table. Neural network-based column type annotation models can use column values and the table context to generate column names (semantic column types). External Knowledge Bases can be used on top of these models to improve semantic column type annotation.

Column semantic annotations then pass through a column filter module 404 that filters based on data quality, interestingness, etc., and eliminate uninteresting, insignificant columns. Enterprise datasets typically contain a large number of columns. However, not all the columns are important, and many columns may not convey anything substantial about the overall data. Hence there is a need to filter uninteresting and unimportant columns. Key columns should be considered. Statistical measures like, e.g., unlikability, peculiarity etc., may be used to capture the interestingness of categorical attributes and prioritize those columns based on diversity of the categorical column. Data quality can be used in filtering columns to filter out columns with a significant percentage of missing values (a threshold percentage of blank values). The synopsis should not highlight data that will not be usable by the user. Furthermore, columns that contain duplicate information can be eliminated.

After filtering, the column annotations under clustering 406 which groups the column annotations. The goal of this stage is to group the columns by their semantic meaning. Once approach comprises calculating embeddings of column names/annotations and group them using a similarity metric like, for example, cosine similarity.

The clusters of column annotations then undergo categorization 408 which assigns a category name keyword to a group of related column names/column annotations. This process can be realized by fine-tuning a large language model like T5 for this task via few-shot learning. A custom prompt can be designed, and a pre-trained language model can be fine-tuned using few examples.

Given the category names, a semantic synopsis generator 410 combines their context and generates coherent natural language sentences 412 that combines the categories. Pre-trained large language models like T5 can be fine-tuned via few shot learning for this task and used.

Figure 5:
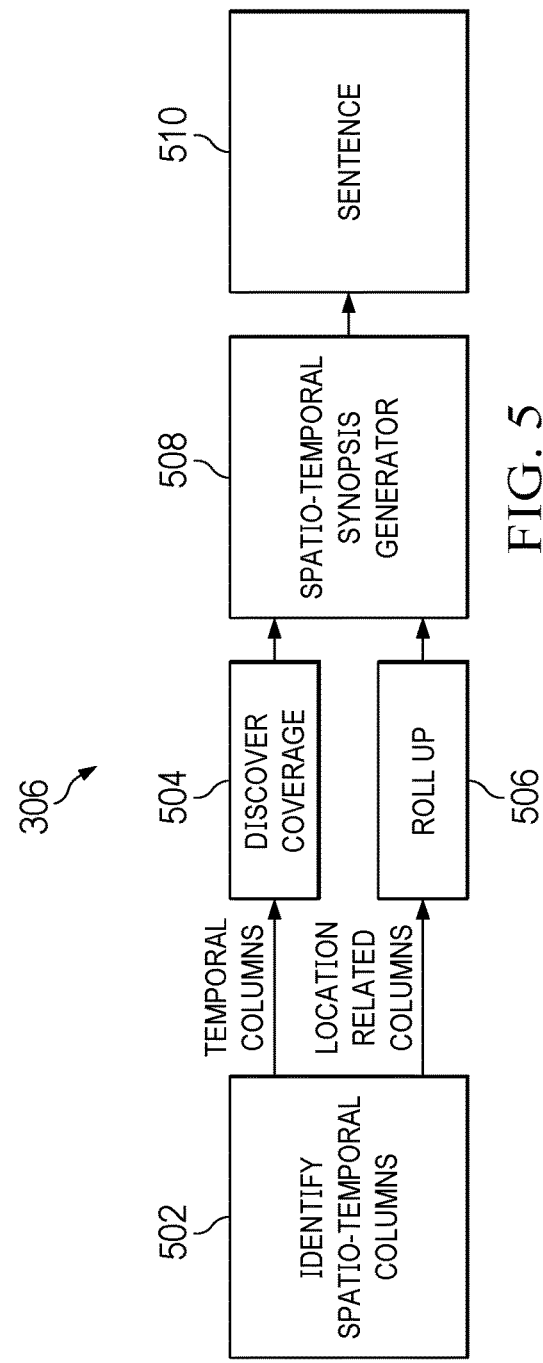
FIG. 5 depicts a block diagram illustrating sematic analysis in accordance with an illustrative embodiment.

FIG. 5 depicts a block diagram illustrating sematic analysis in accordance with an illustrative embodiment. FIG. 5 illustrates an example expanded view of spatio-temporal analysis 306 in FIG. 3. Spatio-temporal analysis comprises analyzing text in terms of information related to location and time.

Spatio-temporal analysis 306 begins by identifying spatio-temporal columns 502 in the dataset. Spatio-temporal data that is part of a dataset provides key context to understand a dataset. Referring back to the example in FIG. 2, dataset 200 includes data related to different boroughs of New York City (location) for the year 2021 (temporal).

Columns in the dataset that contain temporal data undergo coverage discovery 504, which analyzes the coverage period and obtains insights about the duration covered by the data. Columns in the dataset that contain location data undergo roll up 506. The location is organized hierarchically by discovering whether the column values belong to a certain city, state, country, or continent. Roll up 506 can use a pre-trained large language model (foundation model) with encoded knowledge for this task.

Spatio-temporal synopsis generator then combines the location and temporal insights above and generates natural language sentences 510 that include these insights.

Figure 6:
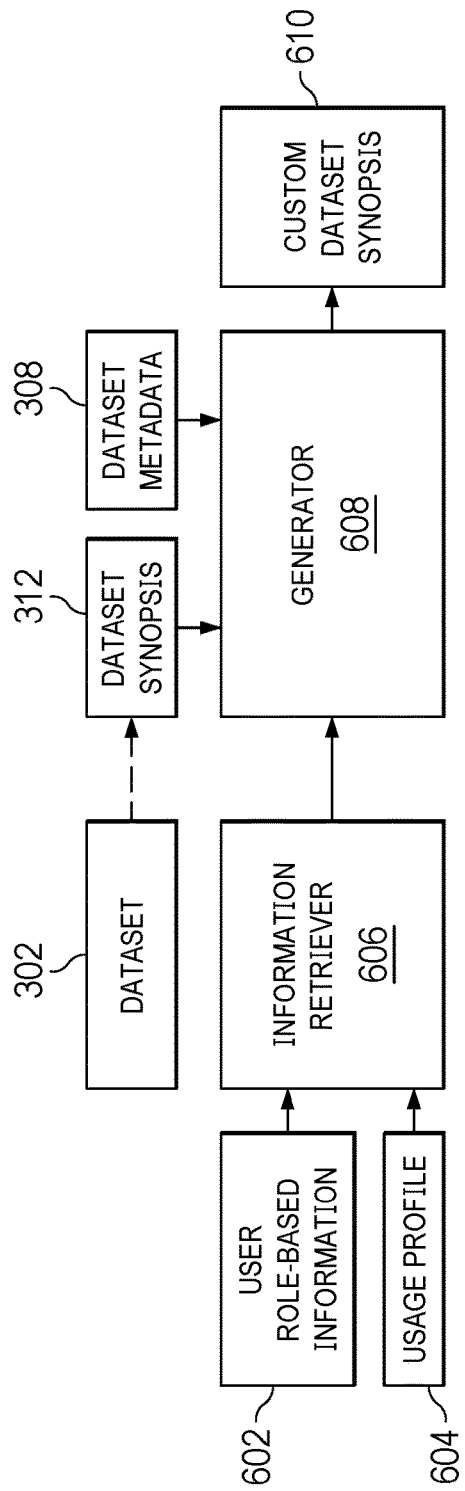
FIG. 6 depicts a block diagram for generating a custom dataset synopsis based on a user role and context in accordance with an illustrative embodiment.

FIG. 6 depicts a block diagram for generating a custom dataset synopsis based on a user role and context in accordance with an illustrative embodiment. There are various personas/roles that use a data catalog system (or a data lake/lakehouse system) like Data scientist, ML Engineer, Data steward, Governance officer, Quality officer, etc. Their priorities and what they look for in a dataset vary widely. Their technical depth and how involved the synopsis should be ideally for them varies. For example, a dataset synopsis detailing the intricate technical details of the dataset may be of interest for a data scientist in order to pick it for modeling while unnecessary for a governance officer interested in knowing what the dataset is about and what is the source and compliance details of the dataset.

Hence a single dataset synopsis for all will not suffice. For better dataset search and discovery/selection, the semantic synopsis needs to be customized to the user. Customization utilizes the defined user roles and dynamic usage analysis pattern of the users as additional inputs in generating a natural language dataset synopsis. The reasoning behind this is dynamic usage analysis pattern will provide true feedback on what role user plays during data search and discovery generally.

This customization uses the dataset synopsis 312 from FIG. 3 as an input into a customization generator 608. The dataset metadata 308 that was used to generate the dataset synopsis 312 may also be fed directly into the customization generator 608. Information retriever 606 fetches the user role/persona based information 602 and usage profile details 604 for a given user accessing the dataset 302 and feeds this information into generator 608.

Given retrieved information 602, 604, static dataset synopsis 312, and dataset metadata 308 generator 608 generates a customized dataset synopsis 610 for the user in question. Generator 608 might use, for example, in-context learning via prompting with an instruction fine-tuned large language model or any other modes of fine-tuning. This process does not need large training data since it is not using structured tables but rather a natural language synopsis (312) and well-defined hierarchical user role information and usage profile. The training examples used are mainly to bring in these additional contexts into the generation process.

As an example, a dataset synopsis for user A might be: "The dataset contains market price data for various commodities in different markets, regions, and countries. The columns in the dataset include information about the location and characteristics of the market, the commodity and its unit of measure, the currency used, the product type, the month and year of the price data, and the source of the data."

For another user B the synopsis might be less technical: "This dataset contains information about the prices of different goods and products in different markets around the world. The columns in the dataset might include details about where the markets are located, what goods are being sold, and how much they cost."

Figure 7:
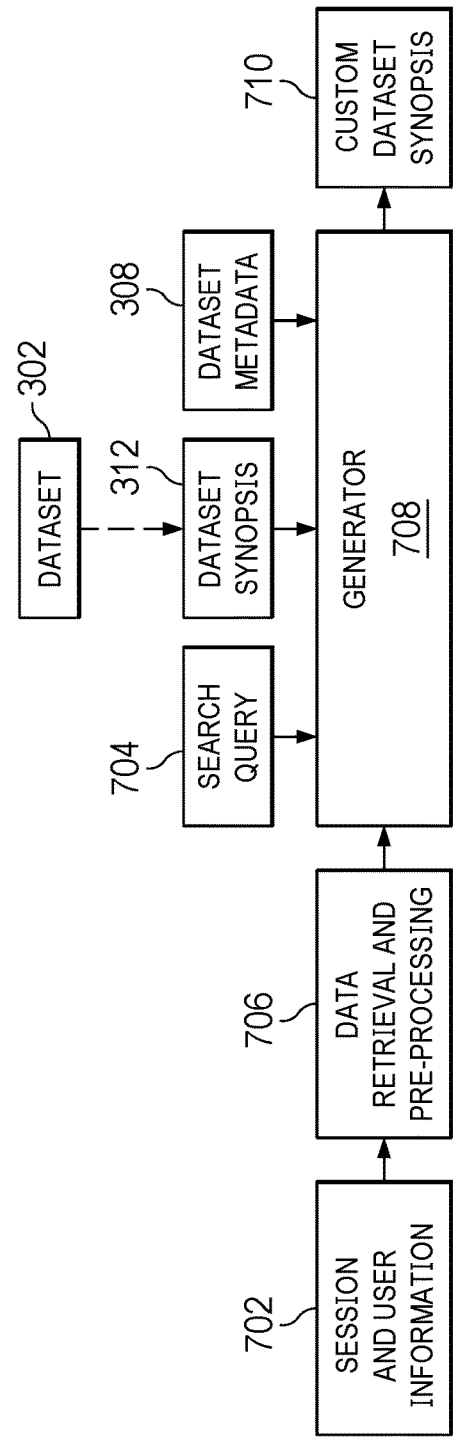
FIG. 7 depicts a block diagram for generating a custom dataset synopsis based on a user search query in accordance with an illustrative embodiment.

FIG. 7 depicts a block diagram for generating a custom dataset synopsis based on a user search query in accordance with an illustrative embodiment. Generally, a user searches for a dataset in a data catalog system (or a data lake/lakehouse system) via free form natural language queries. The search response usually comprises a list of matched datasets. For each dataset in the list, a short description (in our case synopsis) is generally shown as part of a search result, which helps in quick decision making and dataset selection by the user. However, the description/synopsis is generally static.

The process illustrated in FIG. 7 dynamically adapts the dataset synopsis based on the user search query and interactions, which will help in dataset discovery and selection. User search query could be something like 'Educational institution dataset with district-wise details across entire India' or ' . . . dataset with low missing values', etc. The user search query thus provides various clues on spatio-temporal context of the dataset the user is looking for, quality of the dataset, or other characteristics.

Similar to example in FIG. 6, this customization also uses the dataset synopsis 312 from FIG. 3 as an input into a customization generator 708. The dataset metadata 308 that was used to generate the dataset synopsis 312 may also be fed directly into the customization generator 708.

Given a user search query 704, data retrieval and pre-processing 706 fetches the user session and profile information 702 and feeds this information into the customization generator 708. Given search query 704, user session and profile information 702, static dataset synopsis 312, and dataset metadata 308 customization generator 708 generates a customized dataset synopsis 710 for the user in question. Generator 708 might use, for example, in-context learning via prompting with an instruction fine-tuned large language model or any other modes of fine-tuning. Again, this process does not need large training data since it is not using structured tables but rather a natural language synopsis (312) and natural language search query 704. The training examples used are mainly to bring in these additional contexts into the generation process like user/session information.

As an example, the user search query might be: "Commodity prices of the world not older than 3 years." The corresponding dynamic synopsis might be: "The dataset contains detailed information about the prices of various commodities in different markets around the world for the year 2022. The columns in the dataset include information about the location, characteristics, and sources of the market price data, as well as the commodity, currency."

Figure 8:
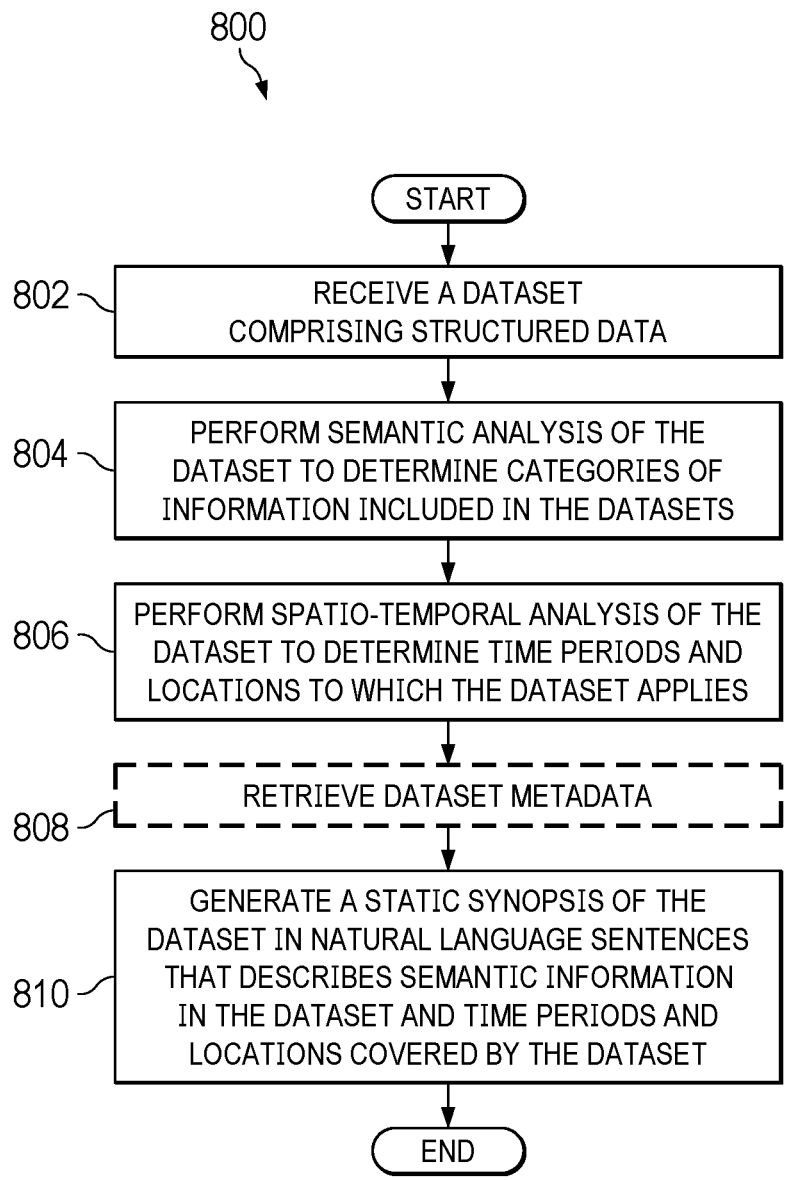
FIG. 8 depicts a flowchart illustrating a process for generating a semantic synopsis in accordance with an illustrative embodiment.

FIG. 8 depicts a flowchart illustrating a process for generating a semantic synopsis in accordance with an illustrative embodiment. Process 800 may be implemented in a computer, such as, for example, computer 101 in FIG. 1 and synopsis generator 180 in FIG. 2.

Process 800 begins by receiving a dataset comprising structured data (step 802). Process 800 performs semantic analysis of the dataset to determine categories of information in included in the datasets (step 804).

Process 800 also performs spatio-temporal analysis of the dataset to determine time periods and locations to which the dataset applies (step 806). The spatio-temporal analysis might be performed concurrently with the semantic analysis. Optionally, process 800 might also retrieve dataset metadata (step 808).

Process 800 then generates a static synopsis of the dataset in natural language sentences that describes semantic information in the dataset and time periods and locations covered by the dataset according to the dataset metadata (step 810). Process 800 then ends.

Figure 9:
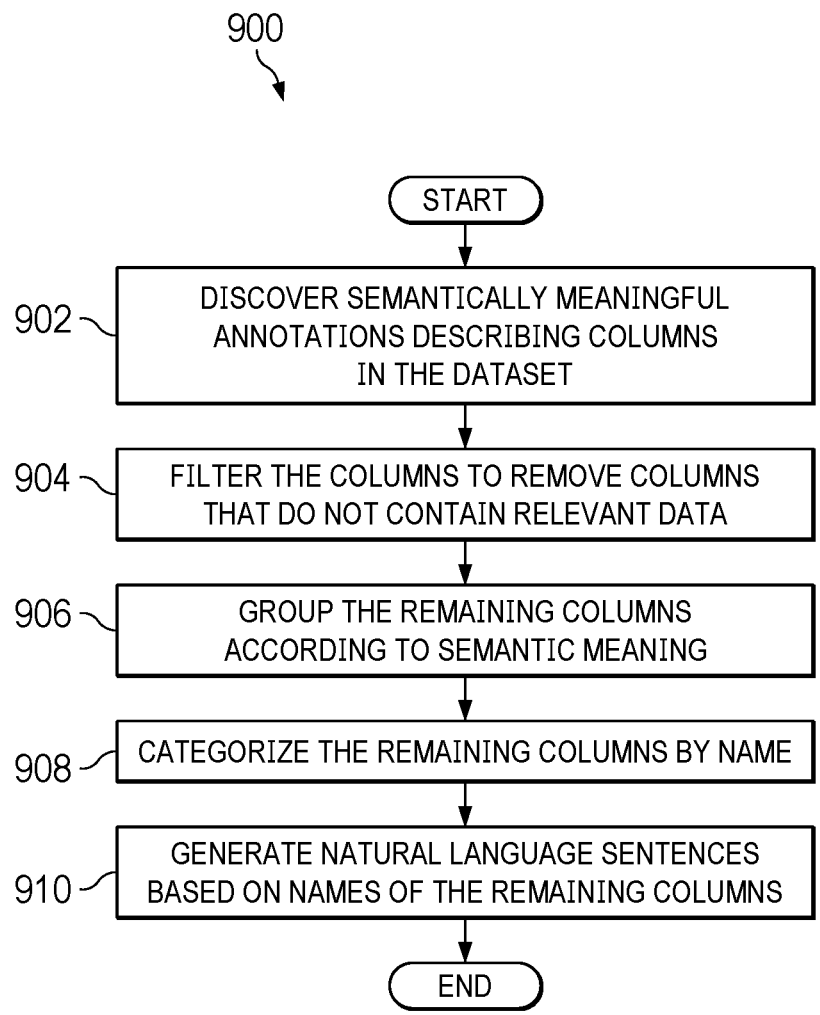
FIG. 9 depicts a flowchart illustrating the process of semantic analysis in accordance with an illustrative embodiment.

FIG. 9 depicts a flowchart illustrating the process of semantic analysis in accordance with an illustrative embodiment. Process 900 is a detailed example of step 804 in FIG. 8.

Process 900 begins by discovering semantically meaningful annotations describing columns in the dataset (step 902). Process 900 then filters the columns to remove columns that do not contain relevant data (step 904). Filtering the columns might comprise eliminating columns that have missing values above a specified threshold and columns that contain duplicate information.

Process 900 groups the remaining columns according to semantic meaning (step 906) and categorizes the remaining columns by name (step 908).

Process 900 generates natural language sentences based on the names of the remaining columns (step 910). Process 900 then ends.

Figure 10:
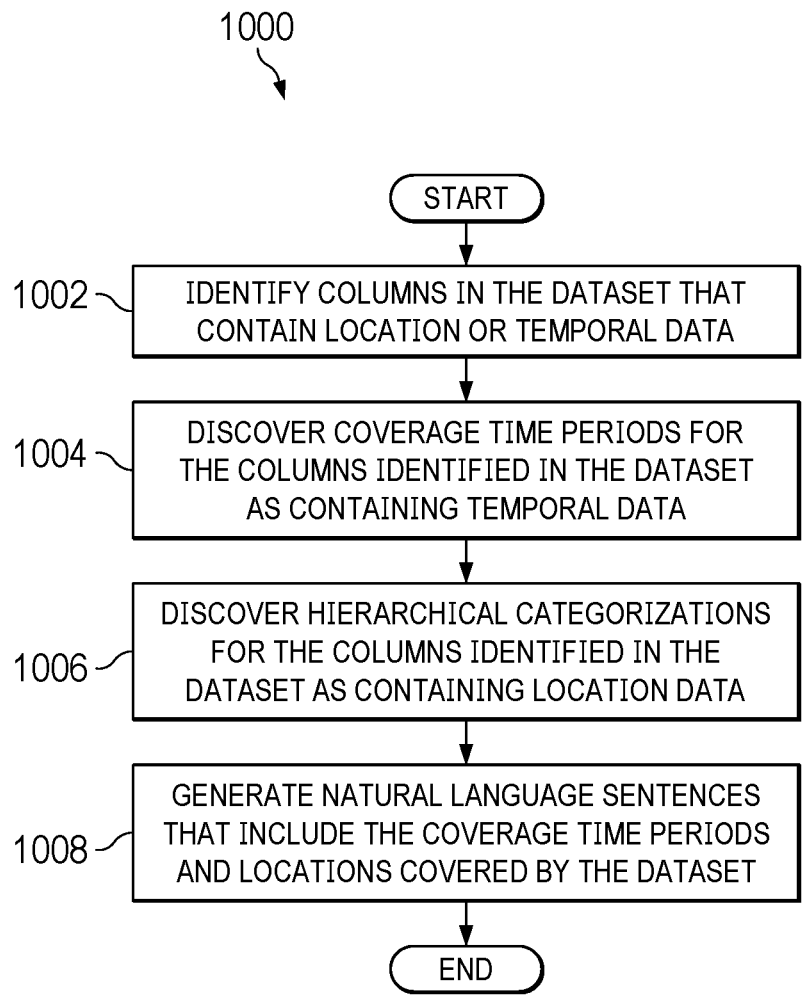
FIG. 10 depicts a flowchart illustrating the process of spatio-temporal analysis in accordance with an illustrative embodiment.

FIG. 10 depicts a flowchart illustrating the process of spatio-temporal analysis in accordance with an illustrative embodiment. Process 1000 is a detailed example of step 806 in FIG. 8.

Process 1000 begins by identifying columns in the dataset that contain location or temporal data (step 1002). Process 1000 discovers coverage time periods for the columns identified in the dataset as containing temporal data (step 1004). Process 1000 also discovers hierarchical categorizations for the columns identified in the dataset as containing location data (step 1006).

Process 1000 generates natural language sentences that include the coverage time periods and locations covered by the dataset (step 1008). Process 1000 then ends.

Figure 11:
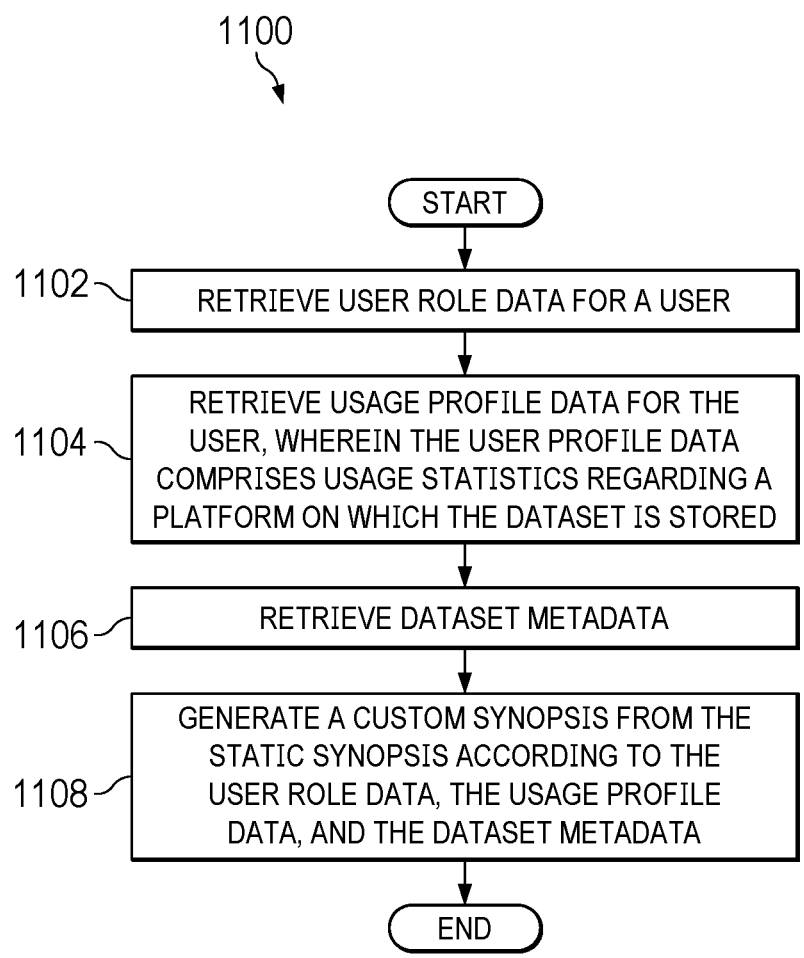
FIG. 11 depicts a flowchart illustrating a process for generating a custom dataset synopsis according to user role in accordance with an illustrative embodiment.

FIG. 11 depicts a flowchart illustrating a process for generating a custom dataset synopsis according to user role in accordance with an illustrative embodiment. Process 1100 uses the static synopsis generated by process 800 as an input.

Process 1100 begins by retrieving user role data for a user (step 1102). Process 1100 also retrieves usage profile data for the user, wherein the user profile data comprises usage statistics regarding a platform on which the dataset is stored such as a dataset catalog (step 1104).

Process 1100 retrieves dataset metadata (step 1106). This dataset metadata might also have been used previously to generate the static synopsis.

Process 1100 generates a custom synopsis from the static synopsis according to the user role data, the usage profile data, and the dataset metadata (step 1108). Process 1100 then ends.

Figure 12:
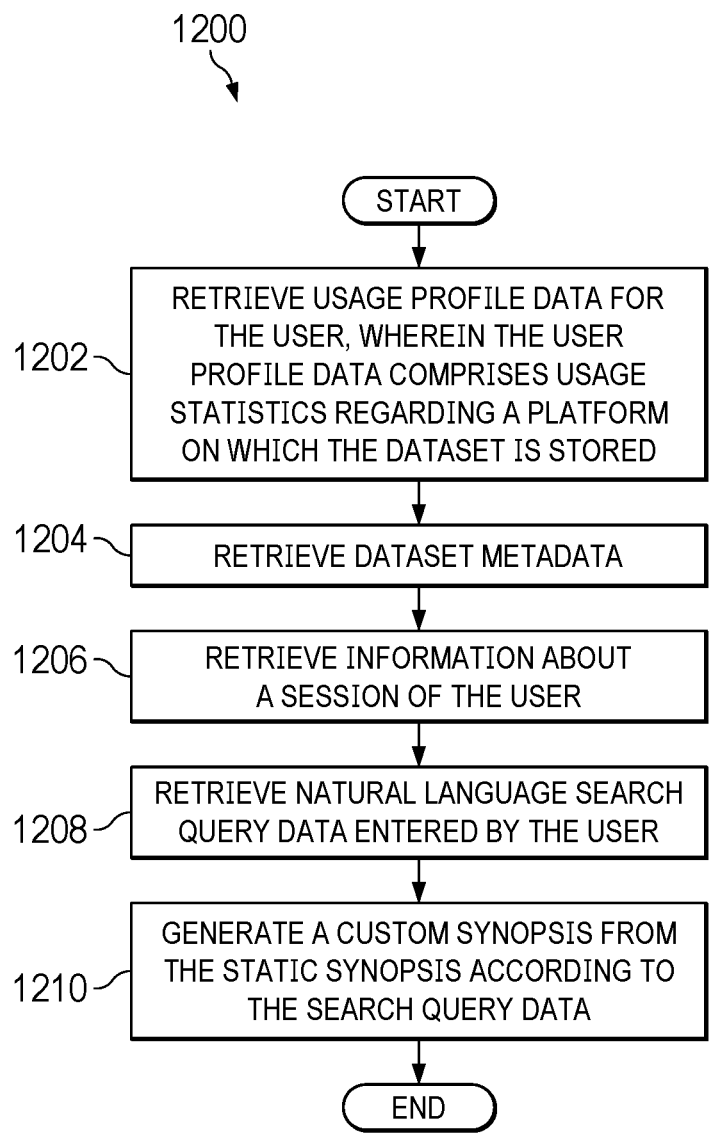
FIG. 12 depicts a flowchart illustrating a process for generating a custom dataset synopsis according to user search data in accordance with an illustrative embodiment.

FIG. 12 depicts a flowchart illustrating a process for generating a custom dataset synopsis according to user search data in accordance with an illustrative embodiment. Process 1200 uses the static synopsis generated by process 800 as an input.

Process 1200 begins by retrieving usage profile data for a user, wherein the user profile data comprises usage statistics regarding a platform on which the dataset is stored such as a dataset catalog (step 1202).

Process 1200 retrieve dataset metadata (step 1204). This dataset metadata might also have been used previously to generate the static synopsis.

Process 1200 retrieves information about a session of the user (step 1206) and retrieves natural language search query data entered by the user (step 1208).

Process 1200 generates a custom synopsis from the static synopsis according to the user session and search query data (step 1210). Process 1200 then ends.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method of generating a semantic synopsis, the method comprising:
    using a number of processors to perform:
    receiving a dataset comprising structured data;
    performing semantic analysis of the dataset to determine categories of information included in the datasets, wherein the semantic analysis comprises:
        discovering semantically meaningful annotations describing columns in the dataset;
        filtering the columns to remove columns that do not contain relevant data;
        grouping the remaining columns according to semantic meaning;
        categorizing the remaining columns by name; and
        generating natural language sentences based on the names of the remaining columns;
    performing spatio-temporal analysis of the dataset to determine time periods and locations to which the dataset applies; and
    generating a static synopsis of the dataset in natural language sentences that describes semantic information in the dataset and time periods and locations covered by the dataset.

2. The method of claim 1, wherein filtering the columns further comprises eliminating:
    columns that have missing values above a specified threshold; and
    columns that contain duplicate information.

3. The method of claim 1, wherein the spatio-temporal analysis further comprises:
    identifying columns in the dataset that contain location or temporal data;
    discovering coverage time periods for the columns identified in the dataset as containing temporal data;
    discovering hierarchical categorizations for the columns identified in the dataset as containing location data; and
    generating natural language sentences that include the coverage time periods and locations covered by the dataset.

4. The method of claim 1, further comprising:
    retrieving user role data for a user;
    retrieving usage profile data for the user, wherein the user profile data comprises usage statistics regarding a platform on which the dataset is stored;
    retrieving dataset metadata; and
    generating a custom synopsis from the static synopsis according to the user role data, the usage profile data, and the dataset metadata.

5. The method of claim 1, further comprising:
    retrieving usage profile data for a user, wherein the user profile data comprises usage statistics regarding a platform on which the dataset is stored;
    retrieving dataset metadata;
    retrieving information about a session of the user;
    retrieving natural language search query data entered by the user; and
    generating a custom synopsis from the static synopsis according to search query data.

6. The method of claim 1, further comprising generating the static synopsis of the dataset according to database metadata in conjunction with the semantic analysis and the spatio-temporal analysis.

7. The method of claim 4, wherein the custom synopsis is generated using in-context learning via prompting with an instruction fine-tuned large language model.

8. A system for generating a semantic synopsis, the system comprising:
    a storage device that stores program instructions;
    one or more processors operably connected to the storage device and configured to execute the program instructions to cause the system to:
    receive a dataset comprising structured data;
    perform semantic analysis of the dataset to determine categories of information included in the datasets, wherein the semantic analysis comprises:
        discovering semantically meaningful annotations describing columns in the dataset;
        filtering the columns to remove columns that do not contain relevant data;
        grouping the remaining columns according to semantic meaning;
        categorizing the remaining columns by name; and
        generating natural language sentences based on the names of the remaining columns;
    perform spatio-temporal analysis of the dataset to determine time periods and locations to which the dataset applies; and
    generate a static synopsis of the dataset in natural language sentences that describes semantic information in the dataset and time periods and locations covered by the dataset.

9. The system of claim 8, wherein filtering the columns further comprises eliminating:
    columns that have missing values above a specified threshold; and
    columns that contain duplicate information.

10. The system of claim 8, wherein the program instructions that cause the system to perform the spatio-temporal analysis further cause the system to:
    identify columns in the dataset that contain location or temporal data;
    discover coverage time periods for the columns identified in the dataset as containing temporal data;
    discover hierarchical categorizations for the columns identified in the dataset as containing location data; and
    generate natural language sentences that include the coverage time periods and locations covered by the dataset.

11. The system of claim 8, wherein the program instructions further cause the system to:
    retrieve user role data for a user;
    retrieve usage profile data for the user, wherein the user profile data comprises usage statistics regarding a platform on which the dataset is stored;
    retrieve dataset metadata; and
    generate a custom synopsis from the static synopsis according to the user role data, the usage profile data, and the dataset metadata.

12. The system of claim 8, wherein the program instructions further cause the system to:

retrieve usage profile data for a user, wherein the user profile data comprises usage statistics regarding a platform on which the dataset is stored;

retrieve dataset metadata;

retrieve information about a session of the user;

retrieve natural language search query data entered by the user; and generate a custom synopsis from the static synopsis according to search query data.

13. The system of claim 8, wherein the program instructions further cause the system to generate the static synopsis of the dataset according to database metadata in conjunction with the semantic analysis and the spatio-temporal analysis.

14. The system of claim 11, wherein the custom synopsis is generated using in-context learning via prompting with an instruction fine-tuned large language model.

15. A computer program product for generating a semantic synopsis, the computer program product comprising:

a persistent storage medium having program instructions configured to cause one or more processors to:

receive a dataset comprising structured data;

perform semantic analysis of the dataset to determine categories of information included in the datasets, wherein the semantic analysis comprises:

discovering semantically meaningful annotations describing columns in the dataset;

filtering the columns to remove columns that do not contain relevant data;

grouping the remaining columns according to semantic meaning;

categorizing the remaining columns by name; and generating natural language sentences based on the names of the remaining columns;

perform spatio-temporal analysis of the dataset to determine time periods and locations to which the dataset applies; and generate a static synopsis of the dataset in natural language sentences that describes semantic information in the dataset and time periods and locations covered by the dataset.

16. The computer program product of claim 15, wherein filtering the columns further comprises eliminating:

columns that have missing values above a specified threshold; and columns that contain duplicate information.

17. The computer program product of claim 15, wherein the instructions to perform the spatio-temporal analysis further comprise instructions to:

identify columns in the dataset that contain location or temporal data;

discover coverage time periods for the columns identified in the dataset as containing temporal data;

discover hierarchical categorizations for the columns identified in the dataset as containing location data; and generate natural language sentences that include the coverage time periods and locations covered by the dataset.

18. The computer program product of claim 15, further comprising instructions to:

retrieve user role data for a user;

retrieve usage profile data for the user, wherein the user profile data comprises usage statistics regarding a platform on which the dataset is stored;

retrieve dataset metadata; and generate a custom synopsis from the static synopsis according to the user role data, the usage profile data, and the dataset metadata.

19. The computer program product of claim 15, further comprising instructions to:

retrieve usage profile data for a user, wherein the user profile data comprises usage statistics regarding a platform on which the dataset is stored;

retrieve dataset metadata;

retrieve information about a session of the user;

retrieve natural language search query data entered by the user; and generate a custom synopsis from the static synopsis according to search query data.

20. The computer program product of claim 18, wherein the custom synopsis is generated using in-context learning via prompting with an instruction fine-tuned large language model.

* * * * *